C. L. HILL.
ASBESTOS PACKING.
APPLICATION FILED SEPT. 19, 1911.
1,035,190. Patented Aug. 13, 1912.
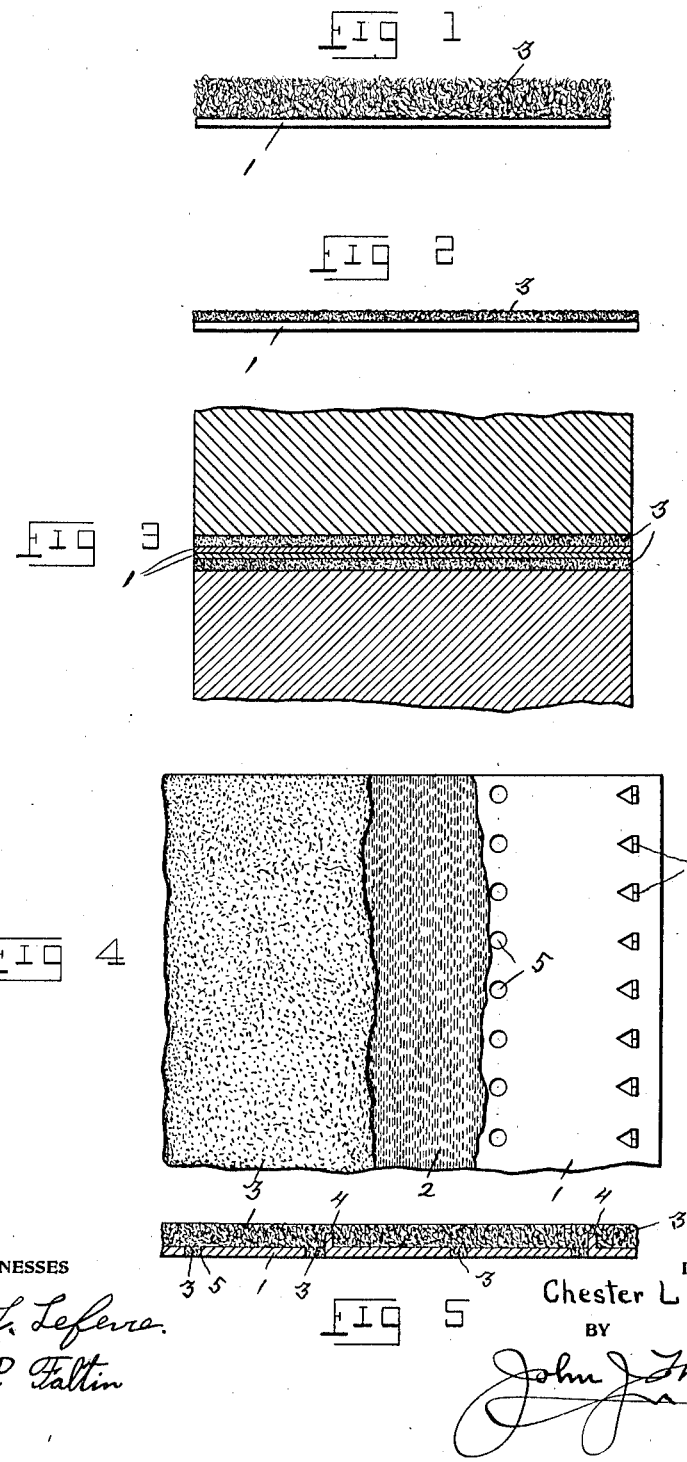
WITNESSES
INVENTOR
Chester L. Hill,
BY
ATTORNEY

UNITED STATES PATENT OFFICE.

CHESTER L. HILL, OF MANHEIM, PENNSYLVANIA, ASSIGNOR TO UNITED STATES ASBESTOS COMPANY, OF MANHEIM, PENNSYLVANIA, A CORPORATION OF PENNSYLVANIA.

ASBESTOS PACKING.

1,035,190.     Specification of Letters Patent.     Patented Aug. 13, 1912.

Application filed September 19, 1911. Serial No. 650,085.

*To all whom it may concern:*

Be it known that I, CHESTER L. HILL, a citizen of the United States, residing at Manheim, in the county of Lancaster and State of Pennsylvania, have invented certain new and useful Improvements in Asbestos Packing, of which the following is a specification, reference being had therein to the accompanying drawing.

This invention relates to an asbestos packing for use in the form of a gasket for packing the joints of machinery, and more particularly the heads of gas and steam engines and piping where it is desired to use a packing that shall not only be tight and strong, but which shall be capable of repeated use, as by the novel construction of this packing, the joint may be repeatedly broken without injury to the packing.

The object of the invention is to produce a packing that shall be cheap, durable and efficient.

Another object of the invention is to provide a packing that may be made up in special forms or in sheets and then cut in the usual way to fit special joints.

Still another object is to produce a packing that shall be fire-proof to withstanding excessive heat and be formed with one metallic face, thus providing a freely breaking joint when the thicknesses of the same packing are placed in the joint with their metallic faces in contact with each other.

With these and other objects in view, my invention consists in certain construction and combination of parts as will hereinafter be fully described and claimed in the annexed specification and claims, and illustrated in the accompanying drawings which form a part of this application, and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings:—Figure 1, is an end view of a portion of the packing before the same has been pressed in the process of manufacture. Fig. 2, is a view of the same after being pressed and finished. Fig. 3, is a sectional view of a machinery joint showing the sheets of packing applied thereto to form a freely breaking joint. Fig. 4, is a top plan view of a portion of packing showing the different layers of material, and also showing a novel way of preparing the metallic sheet to facilitate the adhesion of the asbestos thereto. Fig. 5, is a sectional view of a sheet of packing showing this construction.

Referring to the drawings: 1 indicates a thin sheet of copper or other suitable material which is first sized upon one surface with glue or other adhesive compound 2, and is then coated with a layer of flocculent asbestos fiber 3, which is mixed with an adhesive compound, and the whole is then compressed as shown in Figs. 2, and 3; the pressure applied being even and vertical, as a rolling pressure such as imparted by a set of rolls would tend to push or slide the asbestos from the metal, while a direct vertical pressure produces a packing of even thickness.

To render the adhesion of the asbestos and the metal 1, more permanent, the metal may be formed with a series of points 4, struck from the metal 1, and may also be perforated or formed with a series of holes 5; which, when the asbestos fiber is pressed thereon, the asbestos will enter said holes 5, and the orifice formed by striking up the points 4, and will also embrace said points 4; thus making it impossible to separate the metal 1, and the fiber 3, by ordinary handling or use, and providing a very strong and durable packing.

Having thus described my invention what I claim as new and desire to secure by Letters Patent is:—

1. As an article of manufacture, a packing composed of a layer of thin metal, and a layer of asbestos fiber containing an adhesive secured thereto.

2. A fire-proof packing comprising a sheet of metal, a layer of sizing thereon, and a layer of asbestos fiber containing an adhesive compound compressed thereon.

3. A fire-proof packing, comprising a sheet of metal, formed with a series of perforations therein, a layer of asbestos fiber containing an adhesive material, compressed upon said sheet of metal and entering said perforations.

4. As an article of manufacture, a sheet packing, comprising a sheet of thin metal, points projecting from the surface of said sheet, and a layer of asbestos fiber and adhesive compound compressed upon said sheet and embracing said points.

5. A fire-proof sheet packing, comprising a metallic sheet formed with a series of perforations, a series of points struck from said metallic sheet, and projecting from the surface thereof, a layer of sizing upon said metallic sheet, and a layer of asbestos fiber and adhesive compound compressed upon said metallic sheet, and within said perforations and embracing said points.

In testimony whereof I affix my signature in presence of two witnesses.

CHESTER L. HILL.

Witnesses:
S. R. ZIMMERMAN,
J. GUY ESHLEMAN.